United States Patent [19]

Goodrich

[11] Patent Number: 5,448,591
[45] Date of Patent: Sep. 5, 1995

[54] METHOD AND APPARATUS FOR CLOCK AND DATA DELIVERY ON A BUS

[75] Inventor: Allen B. Goodrich, Palo Alto, Calif.

[73] Assignee: NeXt, Inc., Redwood City, Calif.

[21] Appl. No.: 557,556

[22] Filed: Jun. 24, 1990

[51] Int. Cl.$^6$ .............................................. H04B 3/00
[52] U.S. Cl. .................................................. 375/257
[58] Field of Search ................. 375/7, 8, 36, 106, 113, 375/121, 38; 333/19, 124; 328/105

[56] References Cited

U.S. PATENT DOCUMENTS

| | | | |
|---|---|---|---|
| 3,710,282 | 1/1973 | Seinecke | 333/130 |
| 4,086,534 | 4/1978 | Olson | 375/36 |
| 4,627,076 | 12/1986 | Staal et al. | 375/36 |
| 4,633,473 | 12/1986 | Ratchford et al. | 375/38 |
| 4,736,394 | 4/1988 | Giovannelli et al. | 375/121 |
| 4,964,141 | 10/1990 | Matsushima et al. | 375/36 |

FOREIGN PATENT DOCUMENTS 2443770  4/1980  France .................................. 375/36

*Primary Examiner*—Stephen Chin
*Attorney, Agent, or Firm*—Fitzpatrick, Cella, Harper & Scinto

[57] ABSTRACT

A bus termination scheme that minimizes signal reflection and that minimizes the effect of the number of devices coupled to the bus. In this invention, a resistor is provided between a signal driver and the transmission bus. In addition, a resistance is provided between the bus and each receiving means. The driver resistor reduces the effective capacitance of the transmission line as well as effectively source terminating the line. The receiver resistor reduces effective capacitance and damps signal reflections. Thus, the performance of the bus is increased by minimizing the effects of the number of drivers and receivers on the bus. In addition, the drivers can be lower powered than prior art drivers because no static and a reduced dynamic load is presented to the driver. Finally, the resistors do not dissipate power continuously but only when a transmitter changes the bus state or potential, further enhancing low power operation. The present invention also provides a method for providing a clock signal from any signal source coupled to the bus. In a data transfer transaction, the present invention utilizes a protocol that permits the transfer of two data words with only a single acknowledgement so that the data rate is decoupled from the control signal rate. This permits data to be transmitted at a double word rate even though control signals are provided at a lower rate.

20 Claims, 7 Drawing Sheets

METHOD AND APPARATUS FOR CLOCK AND DATA DELIVERY ON A BUS

BACKGROUND OF THE PRESENT INVENTION

1. Field of the Invention

This invention relates to the field of communication paths, such as a bus, in a computer system, and the transmission of clock and/or data signals on a bus.

2. Background Art

A computer system consists of a number of modules or components. Computer systems typically include a central processing unit (CPU) such as a microprocessor. The microprocessor is a program controlled device that obtains, decodes and executes instructions. A computer system also includes program storage components for storing program instructions, and data storage components for storing data. These storage components may be read only memory (ROM), random access memory (RAM), disk or tape storage, or any other suitable storage means.

A computer system also includes input/output (I/O) components for connecting external devices to the microprocessor. Special purpose components, such as memory management units or co-processors, may also be part of the computer system.

The various components of a computer system are linked by a communication path referred to as a "bus". The bus is a communication path (such as a set of conductors) used to transfer information such as instructions, data, addresses or control signals between the components of a computer system. The components coupled to the bus can both place a signal onto the bus (signal source) or receive a signal from the bus (signal receiver).

In operation, a signal source, also known as a "driver", asserts a signal on the bus by varying the potential of the bus. The signal source drives the potential on the bus to some predetermined level (high state) and/or pulls the bus to a ground level (low state). Either state of the bus can represent digital information such as logical "1's" or "0's". The signal generated by the driver travels on the bus until it reaches an intended receiver. The receiver, by detecting the state of the bus, receives the information transmitted on the bus.

The performance of the bus, and therefore the performance of the computer system associated with the bus, depends on the "delay time" of signals generated on the bus. The delay time of a signal is a combination of the "propagation delay" (the time it takes a signal to go from the active driver to the furthest end of the bus) and "reflection delay" (the time it takes for any signal reflections to fall below a threshold level, permitting the bus to be driven with a new signal).

For an ideal bus, propagation delay depends only on bus length and the characteristic impedance associated with the bus. In reality, however, propagation delay depends on the number of devices coupled to the bus. Each device coupled to the bus has an associated parasitic capacitance. The effect of this parasitic capacitance is to increase the propagation delay time, lowering bus performance. The more devices coupled to the bus, the greater the effects of the parasitic capacitance and the lower the bus performance.

Reflection delay is also a limiting factor in bus performance. When a signal is driven onto a bus, it travels the length of the bus and is reflected back along the bus toward the source. This reflected signal may be reflected again at the source, resulting in a plurality of reflected signals on the bus. The amplitudes of these reflected signals decay with time until they are no longer detectable. The time it takes a reflected signal to decrease below a predetermined level is known as the settling time or reflection delay.

BUS TERMINATION

FIG. 1A illustrates signal sources and receivers coupled to a bus 10. A signal source, also known as a "driver" 11, is coupled to the bus 10 at point A. One or more signal receiving devices, also known as "loads", 12 and 13, are coupled to the bus 10 at point B. When the driver 11 places a signal on the bus (that is, drives the bus to a predetermined potential), the signal is transmitted from the driver 11 to one or more of the loads 12 and 13. The signal transmitted from point A to point B is reflected back from point B toward point A. This reflected signal is itself reflected back toward point B.

The bus 10 is shown symbolically as a single communications path linking various elements of a computer system. However, in actuality, the bus 10 may be comprised of three different paths, namely a data bus, address bus and control bus. The data bus is used to transfer data. There are usually as many lines on the data bus as the basic word length of the processor. For example, for an 8-bit microprocessor, there are eight data lines. The address bus is used to transfer memory addresses (to select a memory device) or device numbers (to select an I/O port). The control bus is used to communicate and transmit system-wide control and timing signals to synchronize the operation of the separate and different modules of the computer system. Alternatively, two or more paths can be shared. For example, the address and data information can share a single multiplexed path.

FIG. 4A illustrates a signal profile at two points of the bus of FIG. 1A, points A and B. Point A is the location nearest the signal source and point B is the endpoint of the bus. At both points A and B, there are a multitude of reflections 15 which widen the signal profile, increasing the time it takes the signal to return to zero or to a level at which the bus may be reused. This decreases bus performance and slows operation of the bus. The reflections of FIG. 4A add to the settling time of a signal transmitted on the bus 10. The settling time correspondingly increases the delay time and lowers bus performance. These reflections can be minimized or eliminated by "terminating" the bus to damp the reflections.

In the prior art, there are two principal methods of terminating a bus or a signal delivery line; namely series-source termination and parallel termination. Series-source termination is illustrated in FIG. 1B. A signal source, also known as a "driver" 11 is coupled to a bus 10 at point A. A resistor R1 is coupled between the driver 11 and the bus 10 at point B. The resistor R1 has a value designed to match the characteristic impedance of the bus 10. When the driver 11 places a signal on the bus, (that is, drives the bus to a predetermined potential), the signal is transmitted from the driver 11 to one or more of the loads 12 and 13. The signal is then reflected back along the length of the bus toward this signal source, driver 11. The resistor R1 absorbs and dissipates the signal after this first reflection, eliminating further reflected signals on the bus 10.

In a source termination scheme, there is a large reflection at the source end of the bus, and smaller reflections in the middle of the bus. The signal at the end of the bus generally contains no reflections.

Referring now to FIG. 4B, the signal profile for a bus using series source termination is illustrated. Referring to FIG. 1B, point A is the point at which the driver is coupled to the bus and point B is the endpoint of the bus where the signal is received. There are reflections 16 at point A. These reflections add a delay of 2T to the signal where T is the propagation delay of the signal. At point B, there are no reflections in the signal.

Source termination has a total delay time of two times the propagation delay. This is because the signal is subject to the propagation delay from source to load and the reflected signal also takes the entire propagation delay time to travel from the load back to the source.

A disadvantage of such a prior art series source termination scheme is that the method is limited to point to point communication. The signal is only valid at the endpoint of the bus. The signal at bus locations located between the sending and receiving devices is subject to large reflections and may not be valid.

A prior art parallel termination scheme is illustrated in FIG. 2. The bus 10 is terminated at ends B and C with parallel resistors R2 and R3, and R4 and R5, respectively. (In an alternate embodiment, the driver 11 can be located at one end of the bus 10 so that only the opposite end is terminated.) The driver 11 is located at point A between the ends B and C of the bus 10. The value of the resistance at each end of the bus 10 is selected to match the characteristic impedance of the bus. A signal generated at point A is absorbed and dissipated at points B and C, eliminating reflections.

In a parallel termination scheme, there are no signal reflections but the load presented by the resistors must be driven at all times, requiring a large power output. In low power designs, such as CMOS, such continuous output is undesired.

An example of another prior art termination scheme is illustrated in Davidson, et al., U.S. Pat. No. 4,015,147. Davidson is directed to a low power transmission line terminator that uses diodes connected in series at a common node with a transmission line. The diodes are reverse biased into a high impedance state by an applied source voltage. When the transmission line is driven by a voltage within a certain range, the diode provides an infinite impedance. When the voltage driving the line is outside this range, the impedance of the series diodes drops to prevent unwanted reflections. The device of Davidson is a termination scheme that provides a variable termination resistance using non-linear impedances (i.e., diodes).

Another prior art termination scheme is described in Stewart, U.S. Pat. No. 4,748,426. Stewart is an active termination scheme using switched resistors coupled to a transmission cable so that variable resistor combinations can be defined. This allows appropriate termination for various combinations of driving devices to be implemented.

Anantha, U.S. Pat. No. 4,228,369, describes a parallel termination scheme. The terminating resistor of Anantha is a variable resistor that is controlled by making the resistance of the terminating resistor proportional to a reference voltage. The device of Anantha is designed to provide precisely measured termination resistance by use of a voltage dependent resistor.

CLOCK DELIVERY

Another critical factor in computer system performance is the system clock. In a data transmission scheme, data is transmitted on a bus from a sending device to a receiving device. A clock signal is provided to the sending device and the receiving device so that the data can be recovered. A clock is required to define data recovery windows and for matching the data rate. The clock is a constant frequency timing source provided to all components that are coupled to the bus. When a signal source transmits information to a signal receiver, known as a data strobe signal (DSTB), the signal receiver "latches" the information when it receives a clock signal. In operation the clock signal is applied after the information has been placed on the bus and enough time has passed for the information to reach a stable or valid state.

In the prior art, this clock signal is provided from a single source in the computer system. Such a central clock scheme is limited by the propagation delay of components coupled to the bus. Skew adjustment to compensate for propagation delay of devices coupled to the bus must be designed in advance resulting in undesired compromises.

An example of a prior art centralized clock scheme is illustrated in FIG. 5. A centralized clock signal 20 is provided to a data source 22 and a data receiver 23. The data source 22 outputs data onto data bus 21 to be provided to receiver 23. When the clock signal 20 is provided to the data source 22, there is a delay, $T_{source}$ associated with transmitting the clock through the data source. There is a propagation delay, $T_{prop}$ of the clock signal between the data source 22 and the receiver 23 and a setup delay, $T_{setup}$ associated with the receiver 23. The total delay when transmitting a signal is equal to $(T_{source} + 2T_{prop} + T_{setup})$. Typical values of each delay period are 30 nanoseconds for $T_{source}$, 5 nanoseconds for $T_{prop}$ and 5 nanoseconds for $T_{setup}$. Thus, a total delay of approximately 45 nanoseconds is to be expected in prior art, central clock schemes.

In addition, centralized clocking requires high power, which cannot be implemented in low power systems. Control signals in a central clocking scheme are delivered at the same clock rate as data signals. It would be advantageous to provide a scheme in which the control signal rate is independent of the data signal rate.

FLOW CONTROL

Efficient operation of a bus requires "arbitration" and "flow control". Arbitration is a system to control bus access to prevent collisions of signals from different sources. The purpose of flow control is to insure that either a transmitter and/or receiver can regulate the data transmission rate.

Arbitration is a process used to determine which component may "acquire" the bus, that is, use the bus during any particular time period. A bus, being a single communications path, can only accept communication from one device at a time. If two devices attempt to use the bus at the same time, that is, place a signal on the bus at the same time, a "collision" occurs, preventing communication. An arbitration scheme can prevent such collisions by limiting access to the bus to one device at a time. Arbitration schemes may be request and grant schemes, whereby a device wishing to communicate on the bus requests permission to use the bus from a controller. If a permission is granted, that device may transmit on the bus. In other schemes, each device is preassigned particular times during which time that device "owns" the bus. That is, if the device wishes to transmit during that time period, it may, but need not. These schemes are known as time division multiplexing or TDM schemes.

A device which has been granted control over the bus is considered a "master" device. Such a master device may be a signal source or signal receiver, depending on whether it wishes to transmit data or receive data. The master device issues a command to a "slave" device. A slave device is another component coupled to the bus which is not the current master of the bus, Flow control in a computer system is dependent on the type of communication scheme utilized by the system. Flow control is based on a handshake signal, in which an acknowledge signal (ACK), is generated by an addressed slave component in response to a read or write command from a master component. In a read operation, when the addressed component has obtained the appropriate data and placed it on the bus, it asserts an ACK signal to indicate to the master that the slave has completed its operation, when the addressed slave has accepted data from the data bus, the slave device asserts the ACK signal to indicate to the master that the slave has completed its operation.

A typical communications sequence in a computer system is as follows:
1. Bus Master Addresses Slave Device
   Place address on an address bus
   Assert read or write command
   For a write: place data on data bus
   Issue any other status signals
   Slave Accept or Issue Data
   Decode address
   For a read: place data on data bus
   For a write: accept data from data bus
   Assert transfer acknowledge (ACK)
2. Master Acquires Data or Terminates Transfer
   For a read: latch data
   For a write: remove data from data bus
   Negate read or write command
   Remove address from address bus
4. Slave Terminates Cycle
   Negate transfer acknowledge (ACK)
   For a read: remove data from data bus
5. Start Next Cycle The above example illustrates a communications sequence on a bus having separate data and address paths. The sequence has equal application to a system with a multiplexed data/address path.

As noted previously, a bus may have separate data lines and control lines. In the prior art, the data and control signals are delivered from a master to slave at the same rate. Therefore, the data rate is limited by the rate at which control signals can be sent. In addition, the prior art scheme of a master device holding the bus until an acknowledge signal is received results in inefficient use of the bus.

One prior art attempt to decouple the data rate from the control signal rate is known as a "packet scheme." In a packet scheme, information is implemented by sending requests and replies in separate packets. A packet is variable in length. A master device sends a request packet to a slave device and then relinquishes control of the bus. The master does not wait for an ACK signal. Subsequently, when the slave device is ready to reply, it places a reply packet on the bus.

None of the prior art bus systems provide solutions to the problems of bus termination, low power operation, invalid signals, delay caused by centralized clock delivery or delay caused by control signal and data signal flow control problems.

Therefore, it is an object of the present invention to provide a method and apparatus for eliminating reflections on a signal delivery bus.

It is another object of the present invention to provide a method and apparatus for minimizing the propagation delay regardless of the number of devices coupled to a signal delivery bus.

It is yet another object of the present invention to provide a method and apparatus for providing a bus that minimizes or eliminates propagation delay in data transmissions.

It is still another object of the present invention to provide a method and apparatus for providing a bus in which control signal delivery is independent of data signal delivery.

SUMMARY OF THE INVENTION

A bus termination scheme that minimizes signal reflection and that minimizes the effect of the number of devices coupled to the bus is described. In this invention, a resistor is provided between a signal driver and the transmission bus. In addition, a resistance is provided between the bus and each receiving means. The driver resistor reduces the effective capacitance of the transmission line as well as effectively source terminating the line. The receiver resistor reduces effective capacitance and damps signal reflections. Thus, the performance of the bus is increased by minimizing the effects of the number of drivers and receivers on the bus. In addition, the drivers can be lower powered than prior art drivers because no static and reduced dynamic load is presented to the driver. Finally, the resistors do not dissipate power continuously but only when a transmitter changes the bus state or potentials, further enhancing low power operation.

The present invention also provides a method for providing a clock signal from any signal source coupled to the bus. In a data transfer transaction, the present invention utilizes a protocol that permits the transfer of two data words with only a single acknowledgement so that the data rate is decoupled from the control signal rate. This permits data to be transmitted at a double word rate even though control signals are provided at a lower rate.

DETAILED DESCRIPTION OF THE INVENTION

A method and apparatus for data and clock delivery is described. In the following description, numerous specific details, such as number of bus devices, clock rates, etc., are set forth in detail in order to provide a more thorough description of this invention. It will be apparent, however, to one skilled in the art, that the present invention may be practiced without these specific details. In other instances, well known features have not been described in detail so as not to obscure the present invention.

The present invention is a method and apparatus for providing a low power bus system. The bus system architecture results in reduced propagation delay and reflection delay of signals transmitted on the bus, uses a source delivered clocking scheme to reduce the effects of propagation delay on data transactions and decoupled data flow from control signal flow for burst transactions.

BUS TERMINATION

Figure 1A:
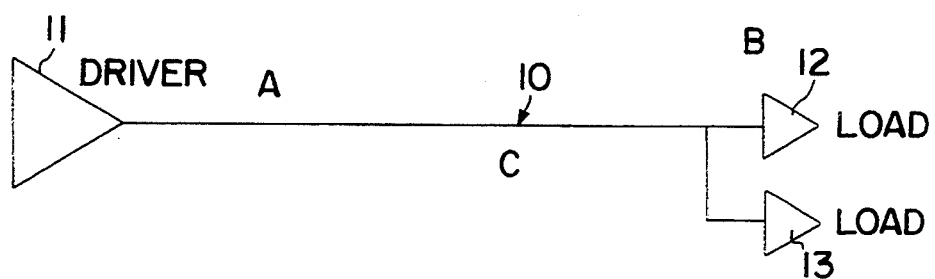
FIG. 1A is a circuit diagram of a prior art bus system.
Figure 1B:
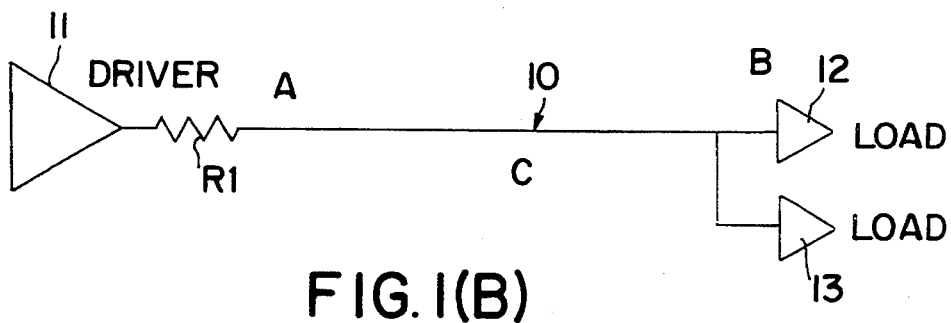
FIG. 1B is a circuit diagram of a prior art series source termination scheme.
Figure 2:
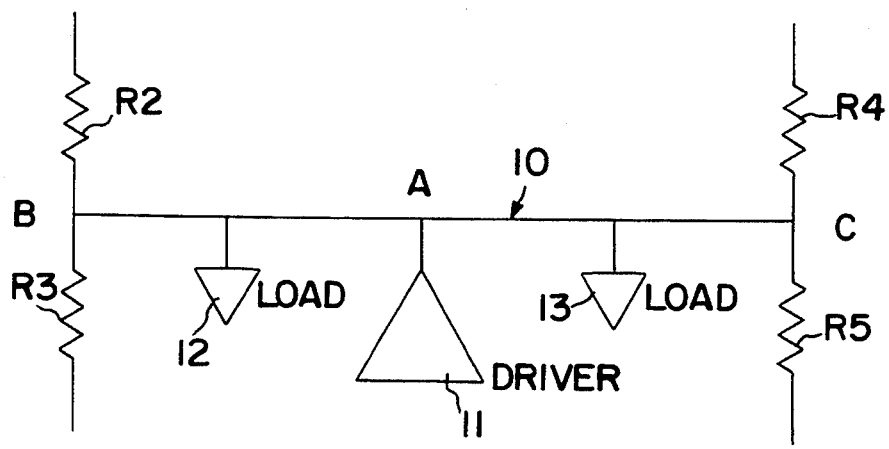
FIG. 2 is a circuit diagram of a prior art parallel termination scheme.
Figure 3:
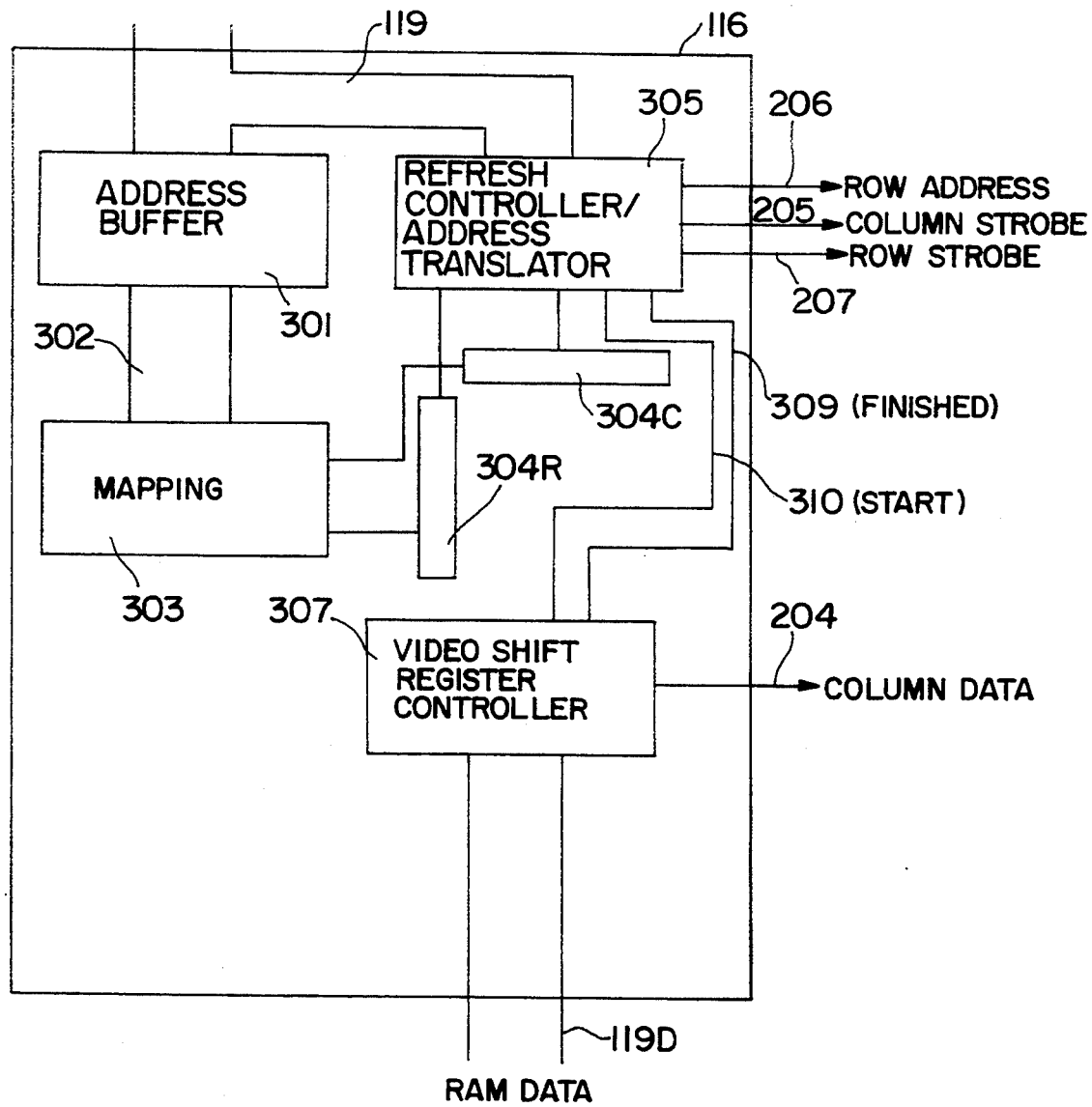
FIG. 3 is a circuit diagram of the distributed termination scheme of the present invention.

A circuit diagram of the preferred embodiment of this invention is illustrated in FIG. 3. A source resistor R6 is coupled between the driver 11 and the bus 10 at point A. The source resistor increases the output impedance of the driver 11 to match the impedance of the bus 10. Each receiver, such as receivers 12, 13 and 14, has an associated resistor R7–R9, respectively. Each receiving device 12–14 has an associated capacitance C1–C3, respectively. This capacitance may be due to the parasitic capacitance of the bus 10 or may be an installed capacitor.

The configuration of FIG. 3 improves bus performance by reducing the total delay time. The receiving resistors R7–R9 in conjunction with the parasitic load capacitor or installed capacitance C1–C3, smooth the small reflection remaining on the bus 10. In addition, the series source resistor R6 terminates any reflection of the signal. Propagation delay time is reduced because the parasitic capacitance normally associated with adding devices to a bus is eliminated. Therefore, propagation delay due to the number of devices coupled to the bus is minimized.

Figure 4A:
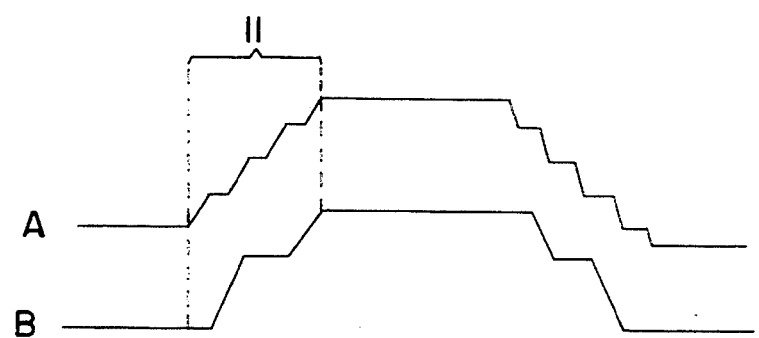
FIG. 4A is a timing diagram illustrating the effects of signal reflection on a transmitted signal.
Figure 4B:
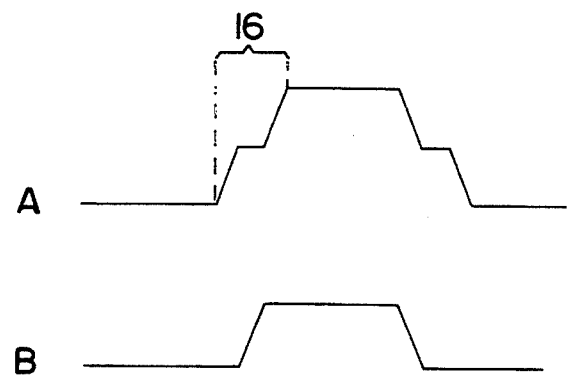
FIG. 4B is a timing diagram illustrating the effects of signal reflection on a transmitted signal in a source termination scheme.
Figure 4C:
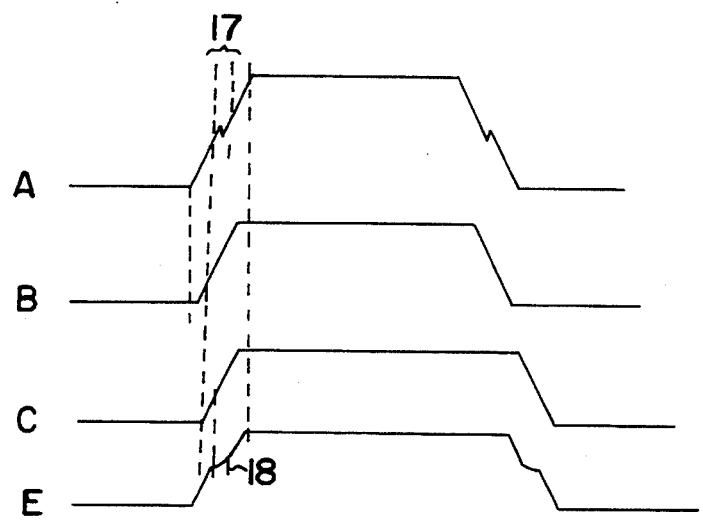
FIG. 4C is a timing diagram illustrating the transmitted signal of the present invention on a bus using the distributed termination scheme of the present invention.
Figure 5:
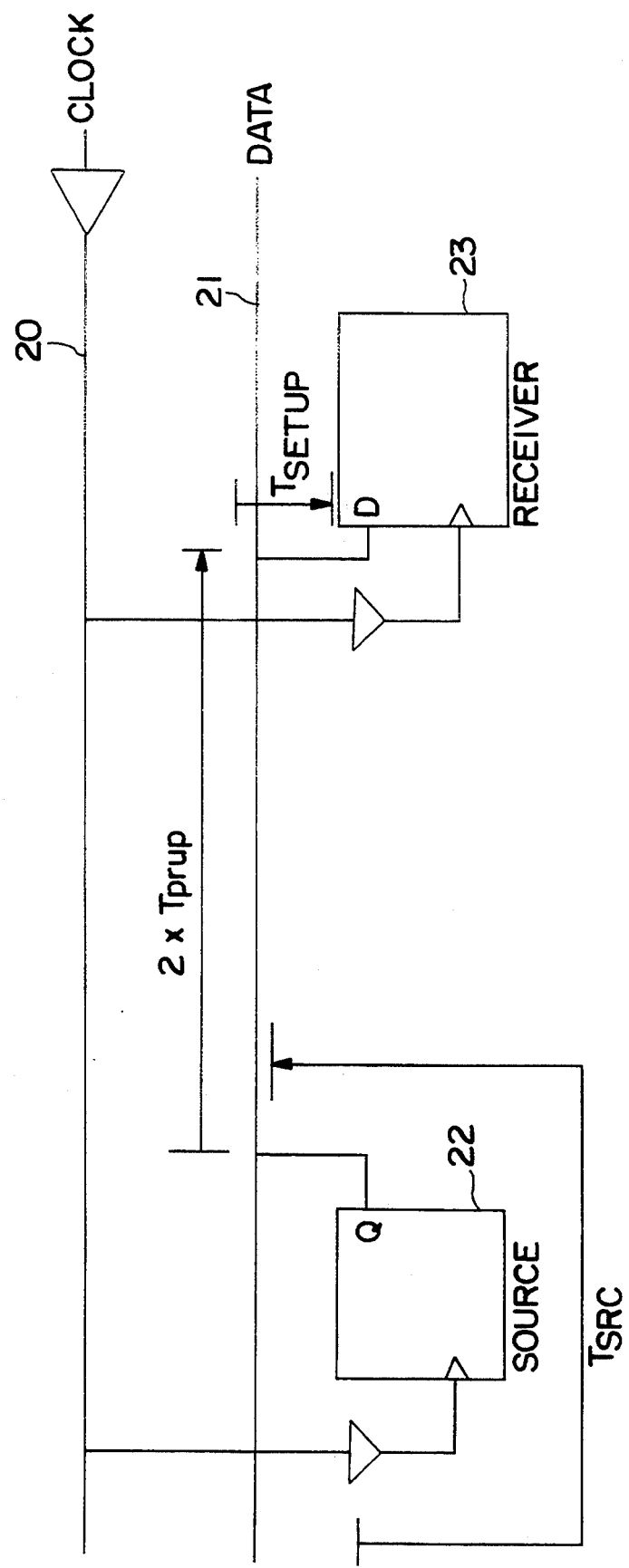
FIG. 5 is a circuit diagram of a prior art central clock scheme.

A timing diagram illustrating the signal profile on bus 10 of FIG. 3 is illustrated in FIG. 4C. Several signal profiles are shown, the signal profile at point A where the driver 11 is coupled to the bus 10, the signal profile at point B where receiver 12 is coupled to bus 10, the signal profile at point C where receiver 14 is coupled to bus 10 and the signal profile at point E, between the resistor R8 and the receiver 13. At point A, there is a small reflection 17. There are no reflections at points B and C, resulting in a smooth signal profile.

At point E, the capacitance C2, in conjunction with resistor R8, damps the reflection 17 so that it appears as a smoother transition occurring later in time at point 18. The reflection 17 has a negatively sloped portion resulting in a temporary reduction in magnitude of the signal. At point E, this negatively sloped portion is flattened out so that there is no magnitude reduction. This results in a more accurate detection of signals at the receiving device. The signals at point D and F are similarly flattened out and occur later in time than the signal at point E.

Because the capacitance of the loads is isolated, the transmission of the signal may be accomplished with minimal delay between destinations on the bus. This feature allows a clock to be provided from any location on the bus. This is opposed to prior art systems in which the clock is generated from a single source to minimize variables in transmission.

The terminating resistors of the scheme of FIG. 3 do not present a static or dynamic resistive load to the driver. Therefore, low power drivers can be used with this invention. Because the capacitance of the loads is isolated from the bus, signal transmission can be accomplished with a minimum of delay and correspondingly a minimum of skew.

Although the present invention has been described in terms of resistors, any suitable impedance means can be utilized. In addition, the impedance means may be a discrete resistor, an integrated resistor, the naturally occurring resistance or impedance of the sending or receiving devices, or a designed in impedance of the sending or receiving device.

CLOCK DELIVERY

The present invention provides an architecture that permits clocking signals, such as data strobe (DSTB), to be provided by the data source. This eliminates effects of spatial skew because both the information and sampling signal come from the same source.

Figure 6:
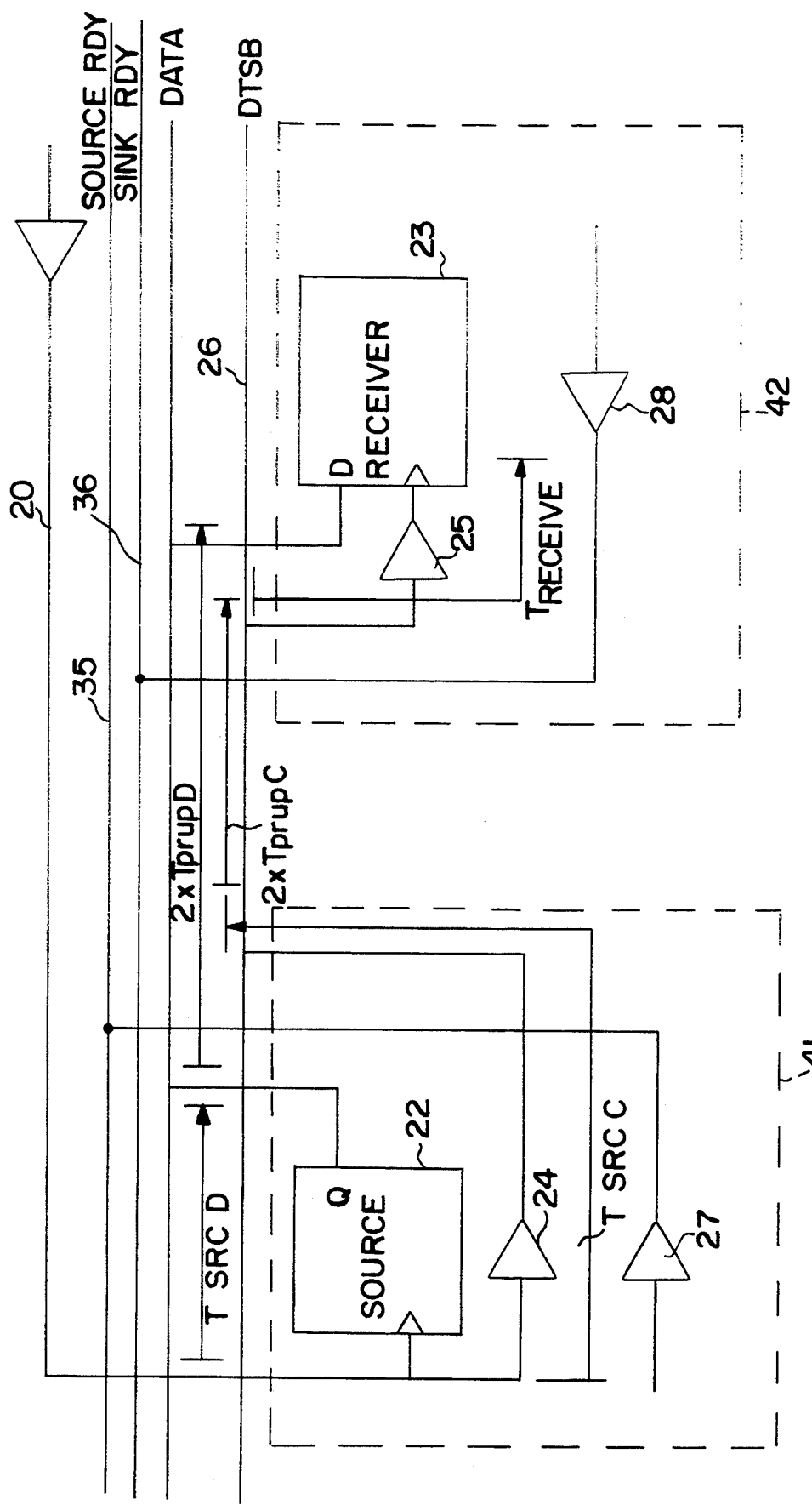
FIG. 6 is a circuit diagram of the present source clock scheme.

The present invention uses a source clocking scheme illustrated in FIG. 6. A device that is sending data also provides a clock signal to the receiving device. Referring to FIG. 6, the clock signal 20 is provided to a flip-flop 22 in the signal source 41. The flip-flop 22 stores the data to be placed on the bus for transfer to a receiving device 42. The clock signal 20 is coupled to amplifier 24 and a copy of the clock signal 26 is provided to the data receiver on DSTB line 26. This clock copy is referred to as a "DSTB" (data strobe) signal in the present invention. The data receiver 42 includes a flip-flop 23. Flip-flop 23 captures the data placed onto the bus by the sending device 41 when the clock signal enables it to latch the data bus signal. Data is provided from the data source to the receiver on data bus 21. The source of data provides the clocking signal with the data regardless of whether that device is the current master device on the bus or whether it is the slave device.

In the source clocking scheme of FIG. 6, there are a number of timing values associated with various paths. $T_{sourceD}$ is the delay associated with transmitting the clock signal through the source flipflop 22. $T_{sourceC}$ is the delay associated with transmitting the clock signal through the amplifier (line driver) 24. $T_{skew}$ is the absolute difference between $T_{sourceD}$ and $T_{sourceC}$. $T_{propD}$ is the propagation delay on the data bus between the source 41 and the receiver flipflop 42. $T_{propC}$ is the propagation delay of the clock signal between the amplifier 24 and the receiver amplifier 25. $T_{receive}$ is the delay between the receiver amplifier 25 and the receiver flipflop 23. When the data source flipflop 22 and amplifier 24 are implemented on a single integrated circuit, $T_{skew}$ can be made very small, on the order of a few percent of the propagation delay. The propagation delay is on the order of 30 nanoseconds so if the skew is, for example, five percent of the propagation delay, $T_{skew}$ is approximately 1.5 nanoseconds. In this invention, the data strobe signal, DSTB 26 is inverted, giving a designed in one-half clock of setup and hold. The setup one-half clock is approximately equal to ($T_{setup} - T_{skew} + 2T_{propD} - T_{receive}$). For a $T_{setup}$ on the order of 5 nanoseconds, a $T_{skew}$ of 1.5 nanoseconds, $T_{propD}$ of 5 nanoseconds and $T_{receive}$ of 5 nanoseconds, the setup one-half clock value is approximately 11.5 nanoseconds.

The hold one-half clock value is given by $T_{hold} + T_{skew} + T_{receive}$. For a $T_{hold}$ value of 5 nanoseconds, the hold one-half value is approximately 11.5 nanoseconds. This gives a repetition rate of approximately 23 nanoseconds, half the rate of the prior art device.

Figure 9:
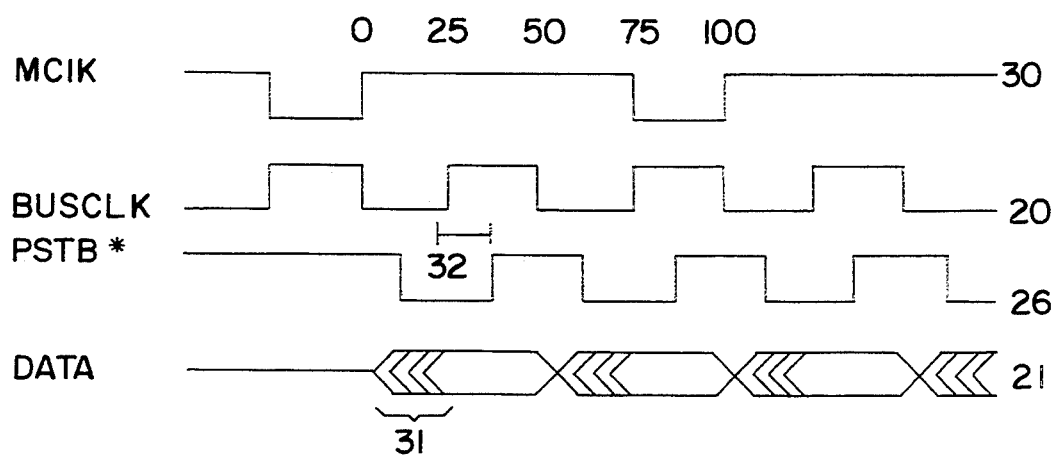
FIG. 9 is a timing diagram illustrating the central clocking scheme of the present invention.

A timing diagram illustrating the relationship between the clock, data and DSTB signals during data transmission is illustrated in FIG. 9. The BUSCLK signal 20 is shared by all devices on the bus and is used by a data source to generate DSTB 26, There is a skew 32 between the rising edges of BUSCLK 20 and DSTB 26. This skew is a factor in the delay time of a data transaction and can be controlled by integrating devices into a single integrated circuit. A control signal MCLK 30 is used to provide timing for control signals and single word transfers.

The data signal 21 provided by the data source in a bus transaction is driven on the rising edge of BUSCLK 20. The data is sampled at the data receiver on the rising edge of DSTB 26. The data aperture 31 must then be valid around the rising edge of DSTB 26.

FLOW CONTROL

The present invention provides a flow control protocol that allows data to be transferred at twice the rate at which control signals can be -transferred. This invention proposes a protocol that allows the transfer of multiple data words (burst mode) with only a single acknowledgement. The following example illustrates the flow control scheme of this invention where two data words are transmitted with a single acknowledgement. The invention is not limited to two word transactions, and a single acknowledge can be used for the transmission of any number of words.

Figure 7:
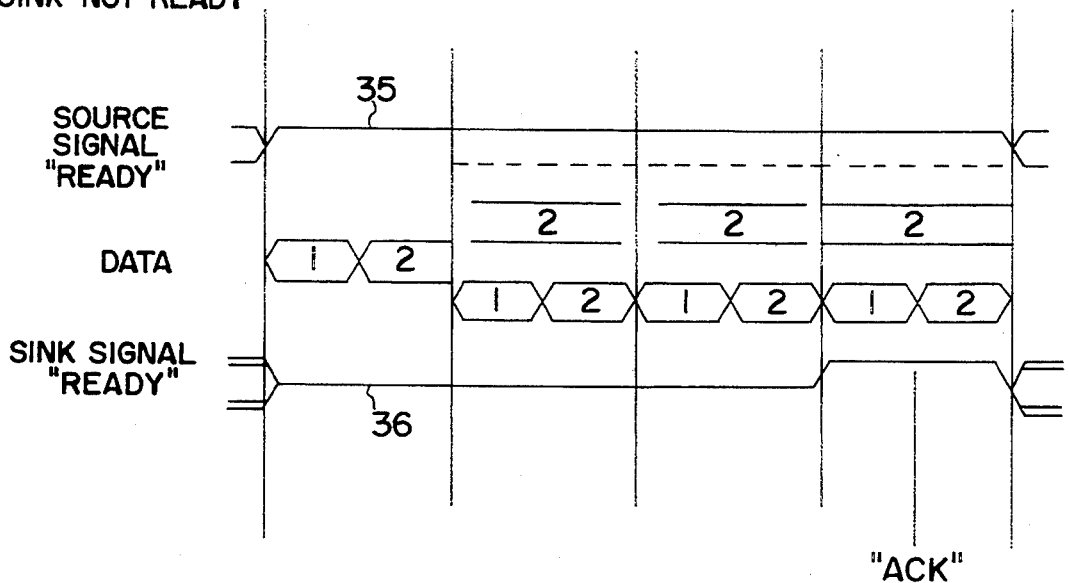
FIG. 7 is a timing diagram illustrating the burst data transfer protocol of the present invention in a first case.

FIG. 7 is a timing diagram illustrating the control signals of the protocol of the invention. The "source signal ready" 35 is a signal provided by the device sending data to indicate the status of that device. The data source may be the master or slave, depending if the operation is a read or write operation. The "sink signal ready" 36 is provided by the device receiving data to indicate its status. Again, either a master and a slave can be a receiving device, depending on the nature of the operation being performed.

Referring to FIG. 6, the source device 41 asserts the source ready line by providing a signal through line driver 27. The receiving device 42 asserts the sink ready line 36 through line driver 28.

The source device holds the source signal "high" to indicate that the source device is able to transfer data at burst mode speed. If the sink signal is low when the source signal is high, data is transferred at normal, non-burst speed. If the sink signal is high when the source signal is high, this indicates the data sink device can receive the current data word and take another word immediately thereafter. This permits the source device to transmit at a double rate. As long as the sink and source signals are high, the source device can transmit at a double rate. Thus, a single acknowledge is used for the transfer of two data words. This allows data to be transferred at twice the rate at which control signals source ready and sink ready are transmitted. A burst mode acknowledge occurs when both the sink signal and source signal lines are asserted.

Read Burst Transaction

In a read transaction using the protocol of this invention, the master device is the data receiver or data sink, and the slave device is the data source. The master device places the slave address on the address bus and asserts the sink signal ready line to indicate that it can receive multiple data words.

The slave device samples the address bus and, after the master has stopped driving the address lines, the slave places data onto the data bus and asserts the source signal ready line to indicate that it can transfer multiple data words. The slave also generates the DSTB signal 26 from BUSCLK 20 and provides it to the master.

After the last two data words of the burst transaction are sent, the slave de-asserts the source ready signal, asserts the DSTB signal and asserts ACK. The master samples the ACK line and releases the bus to the next master, (which may be the same device).

Write Burst Transaction

In a write transaction the master is the signal source and the slave is the signal sink. The master places the slave address on the address bus and, after the slave has sampled the address bus, places data onto the data bus and generates the DSTB signal.

The master asserts the source signal ready line to indicate that it can transfer multiple data words. The slave asserts sink signal ready to indicate that it can receive multiple words. The master sends data as long as the sink signal ready is asserted or until it has only two data words to send. The master then stops sending data and DSTB. The slave de-asserts sink signal ready and asserts ACK.

Figure 8:
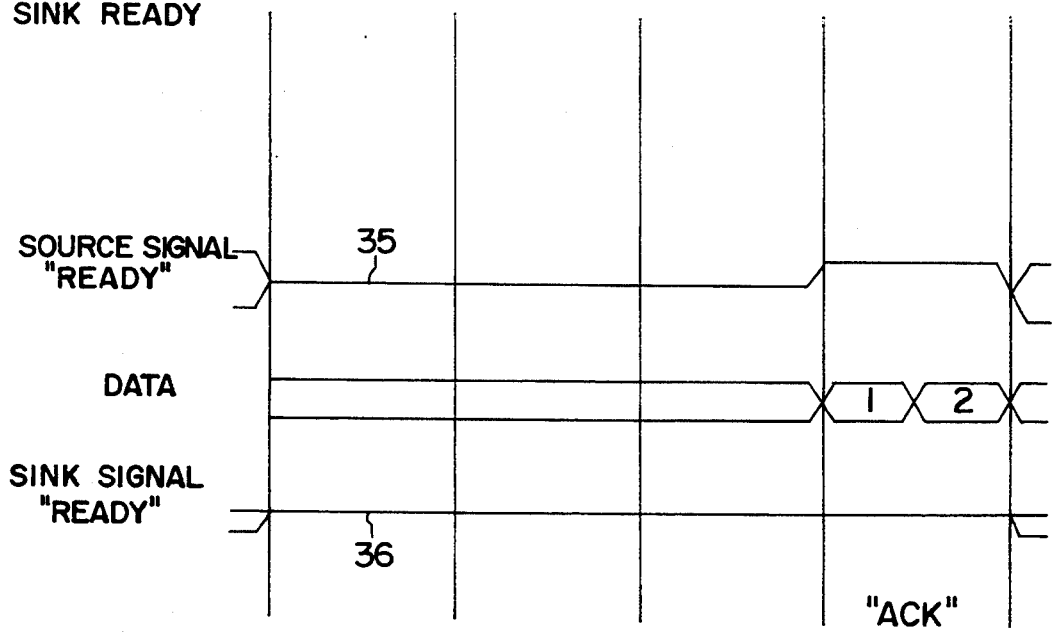
FIG. 8 is a timing diagram illustrating the burst data transfer protocol of the present invention in a second case.

Alternatively, as illustrated in FIG. 8, the data sink may be able to receive two data words but the data source may not be ready to send two data words. In this case, the receiving device holds the sink signal high as long as it is prepared to receive two data words. When the source signal is also high, two data words can be transferred.

The flow control scheme of this invention permits multiple data words to be transferred using a single acknowledge. The source signal ready and sink signal ready lines are independent of master/slave status.

The read burst and write burst examples contemplate a multiplexed address/data bus. However, this invention is not limited to such a configuration but has equal application to any bus configuration.

The present invention is not limited to data transfers when both source ready and sink ready lines are asserted. Other suitable protocols may be implemented where data is transmitted when either of the source ready or sink ready signals is asserted.

Thus, a method and apparatus for clock and data delivery has been described.

I claim:

1. A circuit comprising:
   a bus;
   at least one transmitting device coupled to said bus for providing a signal on said bus;
   at least one receiving device coupled to said bus for receiving said signal on said bus;
   first impedance means coupled between said transmitting device and said bus for providing series termination of said transmitting device;
   second impedance means coupled between said receiving device and said bus for isolating said receiving device from said bus, said second impedance means reducing an effective load capacitance associated with said receiving device, and wherein said second impedance means is resistive.

2. The circuit of claim 1 wherein said effective load capacitance comprises capacitive means coupled at a first node between said second impedance means and said receiving device and at a second node to ground.

3. The circuit of claim 2 wherein said capacitive means comprises a parasitic capacitance associated with said receiving device.

4. The circuit of claim 2 wherein said capacitive means comprises a capacitor.

5. The circuit of claim 1 wherein said first impedance means has an impedance approximately equal to a characteristic impedance of said transmission line.

6. The circuit of claim 1 wherein said first and second impedance means each comprise a discrete resistor.

7. The circuit of claim 1 wherein said first and second impedance means each comprise an integrated resistor.

8. The circuit of claim 1 wherein said first impedance means comprises a designed in resistance of said transmitting device.

9. The circuit of claim 1 wherein said first impedance means comprises an inherent resistance of said transmitting device.

10. The circuit of claim 1 wherein said second impedance means comprises a designed in resistance of said receiving device.

11. The circuit of claim 1 wherein said second impedance means comprises an inherent resistance of said receiving device.

12. A circuit comprising:
    a first transmission line for transmitting data signals;
    a second transmission line for providing a clock signal
    at least one transmitting device coupled to said first transmission line and said second transmission line, said transmitting device for providing said data signals on said first transmission line;
    said transmitting device further including amplifying means coupled to said second transmission line for receiving said clock signal and for providing a copy of said clock signal as output on a third transmission line;
    at least one receiving device coupled to said first transmission line and to said third transmission line for receiving said data signals on said first transmission line and for receiving said copy of said clock signal on said third transmission line.

13. The circuit of claim 12 further including first impedance means coupled between said transmitting device and said first transmission line for providing series termination of said transmitting device.

14. The circuit of claim 13 further including second impedance means coupled between said receiving device and said first transmission line for damping signal reflections on said first transmission line.

15. The circuit of claim 14 wherein said first and second impedance means each comprise a resistor.

16. The circuit of claim 14 wherein said first and second impedance means each comprise an integrated resistor.

17. The circuit of claim 13 wherein said first impedance means comprises a designed in resistance of said transmitting device.

18. The circuit of claim 13 wherein said first impedance means comprises an inherent resistance of said transmitting device.

19. The circuit of claim 14 wherein said second impedance means comprises a designed in resistance of said receiving device.

20. The circuit of claim 14 wherein said second impedance means comprises an inherent resistance of said receiving device.

* * * * *